United States Patent
Van de Sluis et al.

(10) Patent No.: US 10,130,026 B2
(45) Date of Patent: Nov. 20, 2018

(54) GANG MOWER WITH REEL MOWER CUTTING UNITS

(71) Applicants: Jacky Van de Sluis, Limpach (LU); Conny Van de Sluis, Limpach (LU)

(72) Inventors: Jacky Van de Sluis, Limpach (LU); Conny Van de Sluis, Limpach (LU)

(*) Notice: Subject to any disclaimer, the term of this patent is extended or adjusted under 35 U.S.C. 154(b) by 333 days.

(21) Appl. No.: 14/888,493

(22) PCT Filed: May 2, 2014

(86) PCT No.: PCT/EP2014/058988
§ 371 (c)(1),
(2) Date: Nov. 2, 2015

(87) PCT Pub. No.: WO2014/177692
PCT Pub. Date: Nov. 6, 2014

(65) Prior Publication Data
US 2016/0174455 A1    Jun. 23, 2016

(30) Foreign Application Priority Data
May 3, 2013  (EP) ..................................... 13166555

(51) Int. Cl.
*A01B 73/04*        (2006.01)
*A01B 73/06*        (2006.01)
(Continued)

(52) U.S. Cl.
CPC .............. *A01B 73/04* (2013.01); *A01B 63/04* (2013.01); *A01B 73/046* (2013.01); *A01B 73/06* (2013.01);
(Continued)

(58) Field of Classification Search
CPC ........ A01D 34/53; A01D 34/44; A01D 34/62; A01D 75/306; A01B 73/02; A01B 73/06;
(Continued)

(56) References Cited

U.S. PATENT DOCUMENTS 3,808,778 A * 5/1974 Hoffmeyer ............. A01D 34/44
                                                            56/16.2
4,364,581 A * 12/1982 Shoup .................. A01B 73/065
                                                            172/311
(Continued)

FOREIGN PATENT DOCUMENTS

DE             4114681 A1 * 11/1992    ............. A01B 63/32
DE       102006020009 A1 * 11/2006    ........... A01B 51/026
(Continued)

OTHER PUBLICATIONS

Written Opinion of the International Searching Authority dated Nov. 3, 2015 from counterpart PCT App. No. PCT/EP14/58988.
(Continued)

*Primary Examiner* — John Weiss
(74) *Attorney, Agent, or Firm* — James E. Walton

(57) ABSTRACT

A mower provides a frame intended to be implemented on a tractor, or to form a structure of a trailer. The mower provides a plurality of cutting units (6), at least six, generally disposed side by side, each cutting unit (6) comprising at least one roller (44) intended to roll on the ground. The mower provides a lift assembly linking the cutting units (6) to the frame and configured for articulating the cutting units (6) between a mowing position and a non-mowing position. In the mowing position, the lift assembly is configured for pressing the cutting units (6) against the ground in order to distribute, at least partially, the mower's weight on the ground via the rollers (44) of the cutting units (6). The mower provides lateral articulated beams (10) linking the cutting units (6). The beams (10) are foldable inwardly and forwardly.

17 Claims, 4 Drawing Sheets

(51) Int. Cl.
*A01D 34/53* (2006.01)
*A01D 34/44* (2006.01)
*A01D 34/62* (2006.01)
*A01D 75/30* (2006.01)
*A01B 63/04* (2006.01)

(52) U.S. Cl.
CPC ............ *A01B 73/065* (2013.01); *A01D 34/44* (2013.01); *A01D 34/53* (2013.01); *A01D 34/62* (2013.01); *A01D 75/306* (2013.01)

(58) Field of Classification Search
CPC ..... A01B 73/04; A01B 73/046; A01B 73/065; A01B 73/00; A01B 63/04
See application file for complete search history.

(56) References Cited

U.S. PATENT DOCUMENTS

| | | |
|---|---|---|
| 4,570,425 A | 2/1986 | Carr |
| 5,076,044 A | 12/1991 | Shattuck |
| 5,459,984 A | 10/1995 | Reichen |
| D602,504 S * | 10/2009 | Lees ............................... D15/16 |
| 2004/0148917 A1* | 8/2004 | Eastwood ........... A01D 75/306 56/6 |
| 2009/0107097 A1* | 4/2009 | Thompson ........... A01D 34/661 56/15.8 |
| 2011/0209453 A1* | 9/2011 | Neudorf ............... A01D 34/661 56/15.2 |
| 2015/0223397 A1* | 8/2015 | Browning ............... A01D 34/76 56/17.1 |

FOREIGN PATENT DOCUMENTS

| | | | |
|---|---|---|---|
| EP | 1929855 A1 | 6/2008 | |
| EP | 2067397 A1 * | 6/2009 | ........... A01B 73/046 |
| GB | 1567939 | 5/1980 | |

OTHER PUBLICATIONS

International Preliminary Report on Patentability dated Nov. 3, 2015 from counterpart PCT App. No. PCT/EP14/58988.
International Search Report dated Jul. 29, 2014 from counterpart PCT App. No. PCT/EP2014/058988.

* cited by examiner

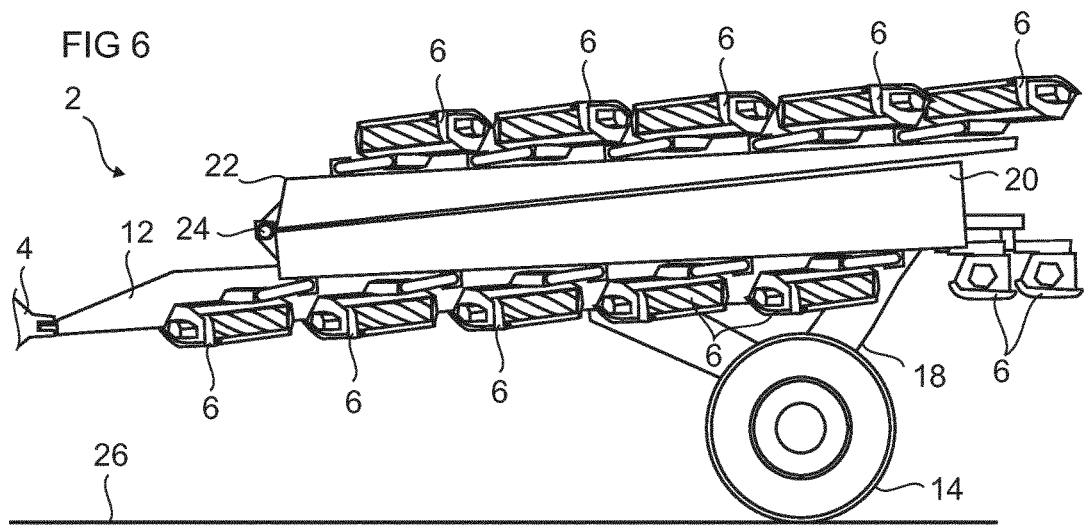
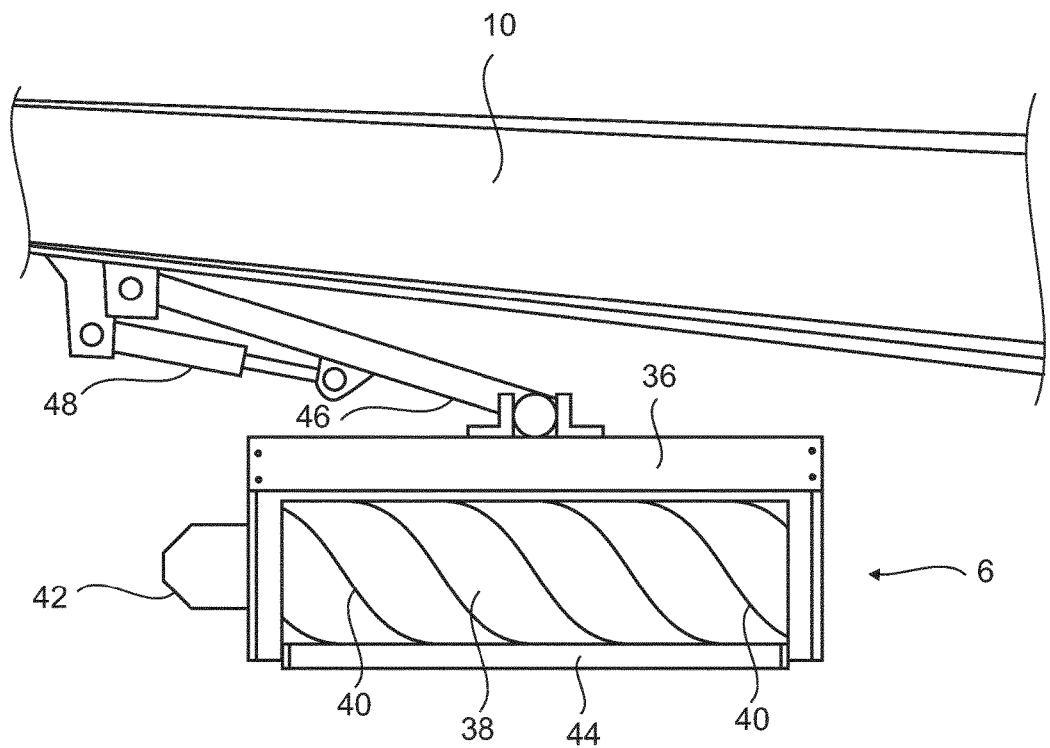

GANG MOWER WITH REEL MOWER CUTTING UNITS

TECHNICAL FIELD

The invention relates to a mower comprising a large number of cutting units with rollers. The invention also relates to a process for folding a mower.

BACKGROUND OF THE INVENTION

In order to increase its mowing capacity, a lawn mower is provided with a plurality of cutting units. These cutting units are positioned side by side in order to provide the broadest width of work as possible. Each cutting unit comprises rotating blades, a casing in order to stop projectiles thrown by the blades, wheels engaging the ground and eventually an engine to rotate the blades. With all these components, each cutting unit is heavy, and a plurality of heavy cutting units represents an important load.

Gang mowers generally comprise a frame that extends laterally in order to connect the cutting units. The cutting units are mounted on the frame and are articulated between a cutting position and a rest position. Thus, the frame has to bear the weight of cutting units when they are in the rest position. In mowing position, the frame also has to withstand shocks due to unevenness of the ground, or due to curt manoeuvers, or eventually the presence of blocks on the grass forming a hurdle.

The broader the frame is, the higher the frame is strained. For this reason, when the mower comprises a plurality of cutting units, for instance more than ten, the frame needs to be peculiarly resistant. This need of resistance implies to conceive a heavy frame. The frame is mounted on wheels that are configured to bear the weight of the mower, including the weight of the frame, and of cutting units.

The document U.S. Pat. No. 5,076,044 A discloses a mowing device with a frame and a plurality of cutting units. Each cutting unit is linked to the frame by means of chains and lift means. The frame shows an elongated shape and may be pulled by a tractor. The frame is configured in order to be disposed transversally to the drive direction of the tractor. The frame relies on a plurality of pairs of wheels who are distributed along the frame. The wheels engage the ground and bear the weight of the frame. However, these wheels may damage the grass due to their number and to the weight they support. In particular, turf rollers production requires mowing frequently the grass sprout even when they are young and consequently weak. The frequency of passages of the wheels will damage the grass culture and reduce the quality of turf rollers. Damages may be more important when the mower follows curves or turns sharply. For instance, wheels may create some notches on the turf. When the mower turns, the wheels exert shear strains at their interface with the turf. These strains damage the crop.

SUMMARY OF THE INVENTION

Technical Problem

The object of the invention is to propose a solution to at least one of the aforementioned problems, more particularly to reduce the risk of damaging a turf with a mower. More particularly, it is an objective of the invention to reduce the risk of damaging a turf with the wheels bearing the frame of a mower.

Technical Solution

The invention consists in a mower comprising a frame intended to be implemented on a tractor, or to form a structure of a trailer, at least height cutting units generally disposed side by side, each cutting unit comprising at least one roller intended to roll on the ground, lift means linking the cutting units to the frame and configured for moving the cutting units between a mowing position and a non-mowing position, remarkable in that, in the mowing position, the lift means are configured for pressing the cutting units against the ground in order to distribute, at least partially, the mower's weight on the ground via the rollers of the cutting units.

In an alternative embodiment of the invention, the above feature relating to the lift means may be replaced by any of the following features.

According to an advantageous embodiment of the invention, each roller extends on the width of the corresponding cutting unit, preferably the rollers cover at least 90% of the width of the mower.

According to an advantageous embodiment of the invention, the cutting units are reel mowing cutting units with a set of helicoidally blades, said mower comprising at least twelve cutting units, preferably at least eighteen cutting units, more preferably at least twenty three cutting units.

According to an advantageous embodiment of the invention, the lift means link independently each cutting unit to the frame.

According to an advantageous embodiment of the invention, the lift means comprise at least one crank linked to the frame and to a cutting unit, preferably the lift means comprise a plurality of cranks, each of which is linked to the frame and to a cutting unit.

According to an advantageous embodiment of the invention, the lift means comprise at least one actuator linked to the frame and directly or indirectly to a cutting unit, preferably the lift means comprise a plurality of actuators, each of which is linked to the frame and directly or indirectly to a cutting unit.

According to an advantageous embodiment of the invention, the majority of the cutting units are disposed in order to transversally overlap their closest neighbor, preferably the majority of the cutting units are disposed along two axes forming a "V" in a top view.

According to an advantageous embodiment of the invention, the frame comprises at least one beam, preferably two beams mainly extending transversally in the mowing configuration; preferably the cutting units are in majority linked to the at least one beam, eventually in the mowing configuration the beams are mounted in a cantilever fashion.

According to an advantageous embodiment of the invention, each beam is pivotally mounted on the frame as to be foldable to a position along a longitudinal axis of said frame, preferably in a forward direction and/or an inward direction.

According to an advantageous embodiment of the invention, each beam comprises a lateral portion and a central portion which are aligned in the mowing configuration; preferably in the transport configuration the lateral portion of each beam is folded back over the top of the corresponding central portion.

According to an advantageous embodiment of the invention, the frame comprises a longitudinal portion that mainly extends longitudinally and shows a front end and a rear end, preferably the cutting units are linked to the frame through the rear half of the elongated portion, more preferably the cutting units are linked to the frame through the rear end of the elongated portion.

According to an advantageous embodiment of the invention, in the mowing configuration the cutting units are generally longitudinally distributed along the longitudinal portion, preferably the cutting units are longitudinally distributed on more than the length of the longitudinal portion, eventually at least one cutting unit is linked to the longitudinal portion of the frame.

According to an advantageous embodiment of the invention, the mower comprises a set of wheels pivotally fixed to the frame, preferably the mower is elongated, the wheels being fixed to the frame in the vicinity of the rear end of the frame.

According to an advantageous embodiment of the invention, in the transport configuration, the majority of the cutting units are above the wheels of the mower, preferably the frame comprises an axle joining the wheel to the frame, the cutting units are generally transversally above the axle.

According to an advantageous embodiment of the invention, the frame comprises a hub to which the beams are linked, and a raise mechanism for lifting the hub from the mowing configuration to the transport configuration, preferably at least one cutting unit is linked to the raise mechanism and/or at least one cutting unit is linked to the hub.

According to an advantageous embodiment of the invention, each cutting unit comprises two lateral skids able to slide on the ground when the associated cutting unit is in mowing position.

According to an advantageous embodiment of the invention, each roller extends on at least 90% of the width of the bladed cylinder of the associated cutting unit, preferably at least 100%, more preferably at least 105%.

According to an advantageous embodiment of the invention, the diameter of the rollers is superior to 4.00 cm, preferably superior to 6.00 cm, more preferably superior to 9.00 cm.

This feature increases the contact area between each roller and the ground, and then decreases the strain applied by each roller on the ground. Hence, grass sprouts will be less crushed by the passage of a roller, which is an important point since rollers are supposed to bear the weight of the frame.

According to an advantageous embodiment of the invention, each roller's length is superior to its diameter, preferably its length is ten times superior to its diameter, more preferably its length is twenty times superior to its diameter.

According to an advantageous embodiment of the invention, at least one actuator of the lift means is linked to a crank and to the frame, preferably each actuator of the lift means is linked to a crank and to the frame.

According to an advantageous embodiment of the invention, the actuators are hydraulic cylinders.

According to an advantageous embodiment of the invention, in the mowing configuration, the lift means are configured in a way to articulate the cutting units along longitudinal axes.

According to an advantageous embodiment of the invention, the lift means are configured for supporting the frame's weight on the rollers of the mower.

According to an advantageous embodiment of the invention, the frame is generally rigid, preferably the frame can show elastic deformations of one of its extremities in respect of the other extremities of less than 5 cm, preferably less than 3 cm, more preferably less than 1 cm. Higher deformations are plastic deformations.

According to an advantageous embodiment of the invention, the beams comprise locking means for preventing them to pivot relatively to each other.

According to an advantageous embodiment of the invention, the mower comprises an axle joining the wheels to the frame.

According to an advantageous embodiment of the invention, the beams are hollow.

According to an advantageous embodiment of the invention, the beams are made of metallic material, preferably of welded steel sheets.

According to an advantageous embodiment of the invention, the beams show an outward thickness reduction.

This feature ensures an increased rigidity at the center of the mower and weight savings.

According to an advantageous embodiment of the invention, the wheels of the mower are main wheels, in the transport configuration the main wheels support the majority of the mower's weight and/or in the mowing configuration the main wheels support the minority of the mower's weight.

According to an advantageous embodiment of the invention, the mower essentially comprises two wheels, preferably the two wheels are the main wheels.

According to an advantageous embodiment of the invention, the wheels of the mower are disposed in a transversally central position.

According to an advantageous embodiment of the invention, in majority, the cutting units are longitudinally regularly spaced along the frame.

According to an advantageous embodiment of the invention, the disposition of the cutting units generally shows symmetry according to a longitudinal and vertical plan.

According to an advantageous embodiment of the invention, the cutting units are disposed side by side transversally.

According to an advantageous embodiment of the invention, in the transport configuration the beams are placed above the wheels.

According to an advantageous embodiment of the invention, in the transport configuration the cutting units are in the non-mowing position in respect with the frame.

The invention also relates to a process for folding a mower according to the invention from a mowing configuration to a transport configuration, the process comprising a first operation of lifting the cutting units and folding the lateral portions back over the tops on the central portions, a second operation of lifting the central portions and the lateral portions, and a third operation of pivoting forwardly the lateral portions and the central portions.

According to an advantageous embodiment of the invention, in the second operation the cutting units of the lateral portions are lifted above the wheels.

According to an advantageous embodiment of the invention, the third operation and the first operation may be inverted, then the operation of lifting the cutting unit of the first operation becomes optional.

Advantages of the Invention

The invention permits, in the mowing configuration, to transfer part of the weight of the frame of the mower to the rollers of the cutting units instead of to the wheels. When the mower is implemented on a tractor, it permits to transfer part of the tractor's weight on the rollers.

The invention affords to reduce the number and/or the size of the wheels of the mower, since in the mowing configuration the frame's weight is supported by rollers instead of these wheels. The invention permits to reduce the width of the wheels which reduces the shear strains generated by the wheels when the mower turns.

During mowing operation mown grass is projected and forms blocks on rear cuttings units. These blocks may fall from cutting units and reduces the quality of turf. The "V" configuration of the cutting units reduces the block formation since a front cutting unit is just ahead of a single cutting unit instead of two.

The invention provides a smart solution for engineering a wide gang mower that becomes thin in the transport configuration. The invention also reduces the overall length of the mower in the transport configuration.

BRIEF DESCRIPTION OF THE DRAWINGS

The FIG. 1 shows an aerial view of a mower according to the invention in mowing configuration.

The FIG. 2 represents a lateral view of a first operation for folding the mower according to the invention.

Figure 3:
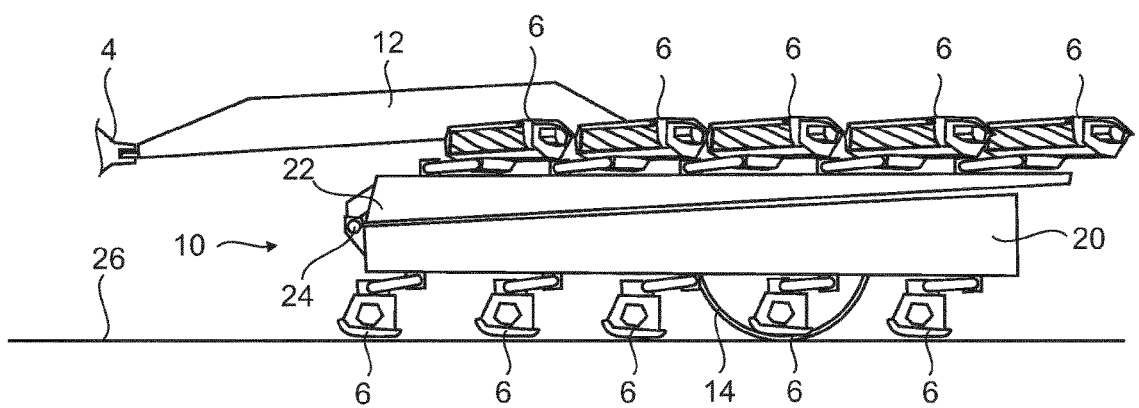

The FIG. 3 illustrates a side view of the mower according to the invention in a first intermediate step.

Figure 4:
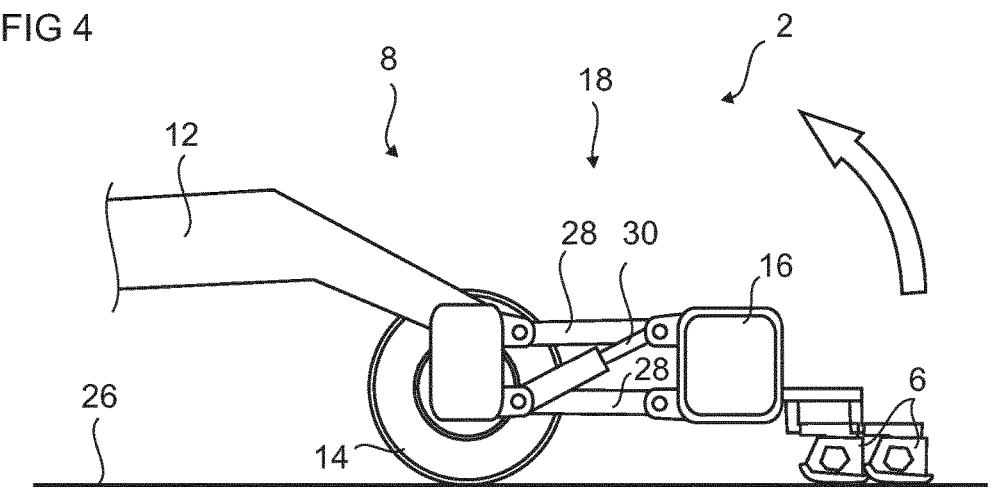

The FIG. 4 represents a lateral view of a second operation for folding the mower according to the invention in transport configuration.

Figure 5:
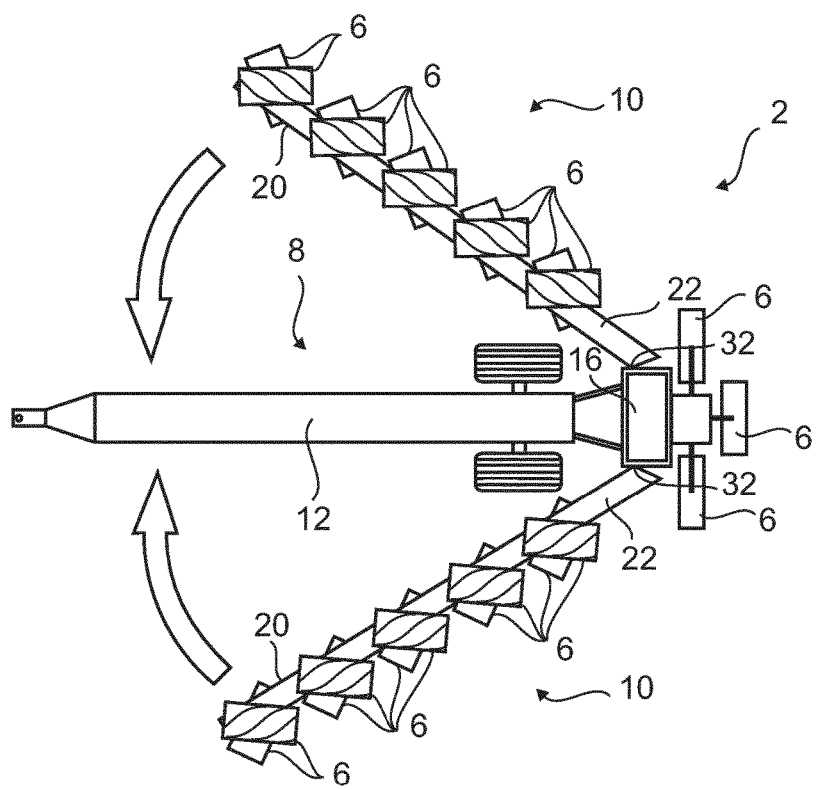

The FIG. 5 is a top view of the third operation for folding the mower according to the invention.

The FIG. 6 represents a lateral view of the mower according to the invention.

The FIG. 7 represents a front view of a cutting unit according to the invention.

DESCRIPTION OF EMBODIMENTS

In the coming description the orientation used corresponds to the orientation shown by the cutting unit shows in mowing configuration. The mower is considered to stand on a flat ground.

Figure 1:
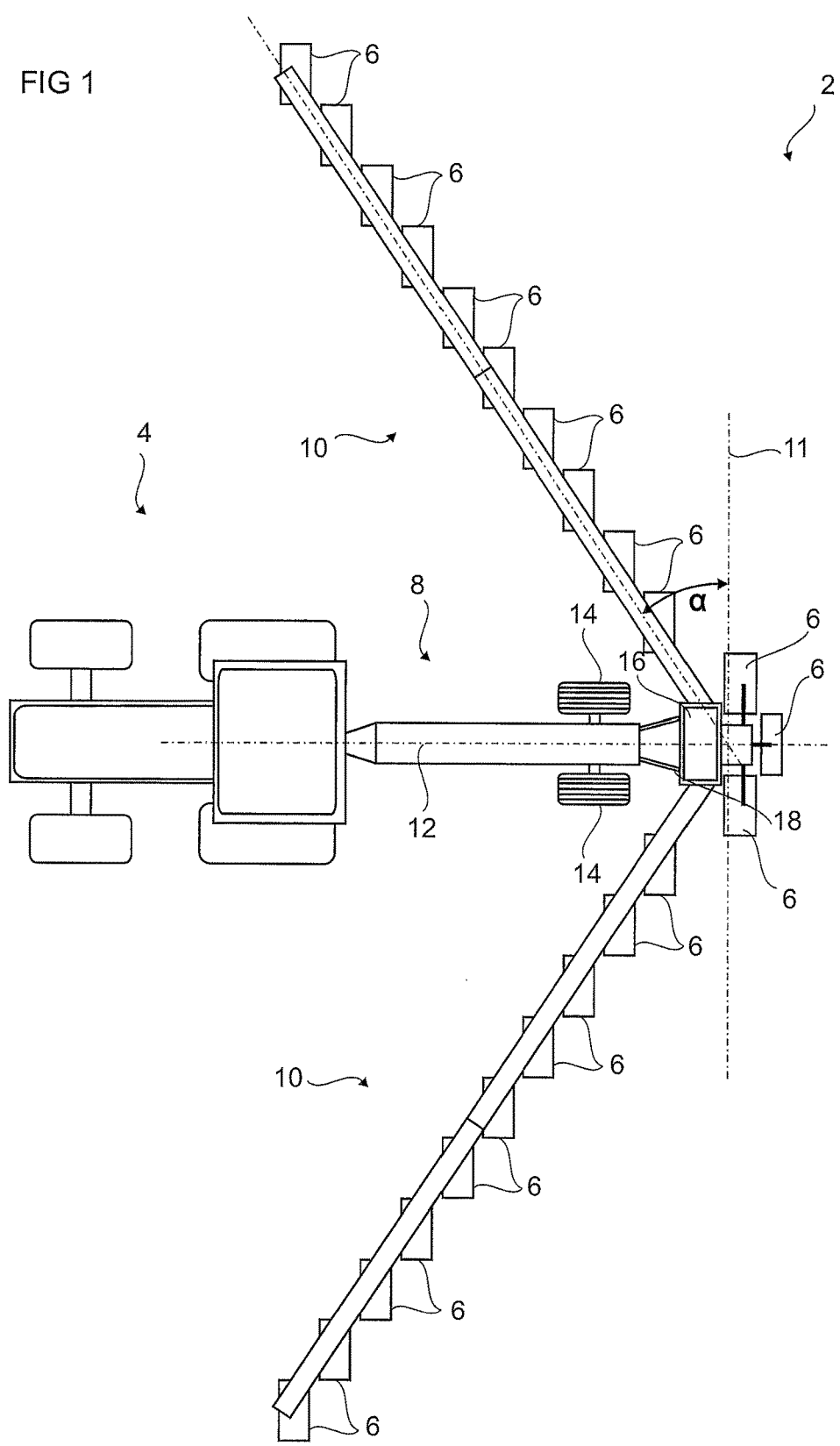

The FIG. 1 illustrates a mower 2 according to the invention. The mower 2 is seen in an aerial view. The mower may be a vehicle. The mower may be a trailer. The mower may be pulled by a tractor 4, or may eventually be an implement mounted on the frame of a tractor, the implement being carried by the tractor's wheels.

The mower 2 comprises at least six cutting units 6, preferably at least eighteen cutting units 6. The cutting units 6 are generally arranged side by side. They generally form alignments. They are generally arranged on two main axes that form a kind of letter "V". Some cutting units may be placed outside the alignments.

The mower comprises a frame 8. The frame 8 comprises at least one beam 10, preferably two beams 10. The beams 10 principally extend transversally. They also extend longitudinally, preferably forward. The beams 10 may extend longitudinally in opposite directions, and longitudinally in the same direction. They are tilted regarding a transversal axis 11. Each beam 10 forms an angle α with the transversal axis 11 that is comprised between 5° and 60°, preferably comprised between 15° and 50°, more preferably comprised between 30° and 40°. The cutting units 6 are linked to the beams 10. Some cutting units 6 may be settled longitudinally at the level of the tractor 4. This feature increases the maneuverability of the mower 2 and the tractor. It also permits to settle forward the center of gravity of the mower.

The frame comprises a longitudinal portion 12. The longitudinal portion 12 is elongated. The longitudinal portion 12 length is superior to three times the width of a cutting unit, preferably five times. The longitudinal portion 12 is transversally placed in a central position. It extends on the majority of the mower's length. The mower 2 also comprises wheels 14. It may comprise wheels 14 linked to the rear half of the longitudinal portion 12, preferably linked at the rear extremity of the elongated portion. Preferably, the gravity centers of the beams 10 are before the wheels 14.

The mower 2 may comprise a hub 16 that connects the beams to the longitudinal portion 12. The mower 2 may comprise lift means for lifting the beams from a mowing configuration to a transport configuration.

The hub 16 can support cutting unit(s) 6 disposed centrally as to cover at the least the width of the frame 12, or at least the width of the frame 12 and the wheels 14. This or these cutting units can be arranged at the rear of the hub 16.

The mower is essentially wide, it may extend on more than ten meters. The mower is wider than the tractor 4, at least two times preferably four times. Hence, it needs to be foldable in order to reduce its width and to respect road regulation in matter of width of a vehicle. The following figures depict the steps for folding the mower in a transport configuration.

Figure 2:
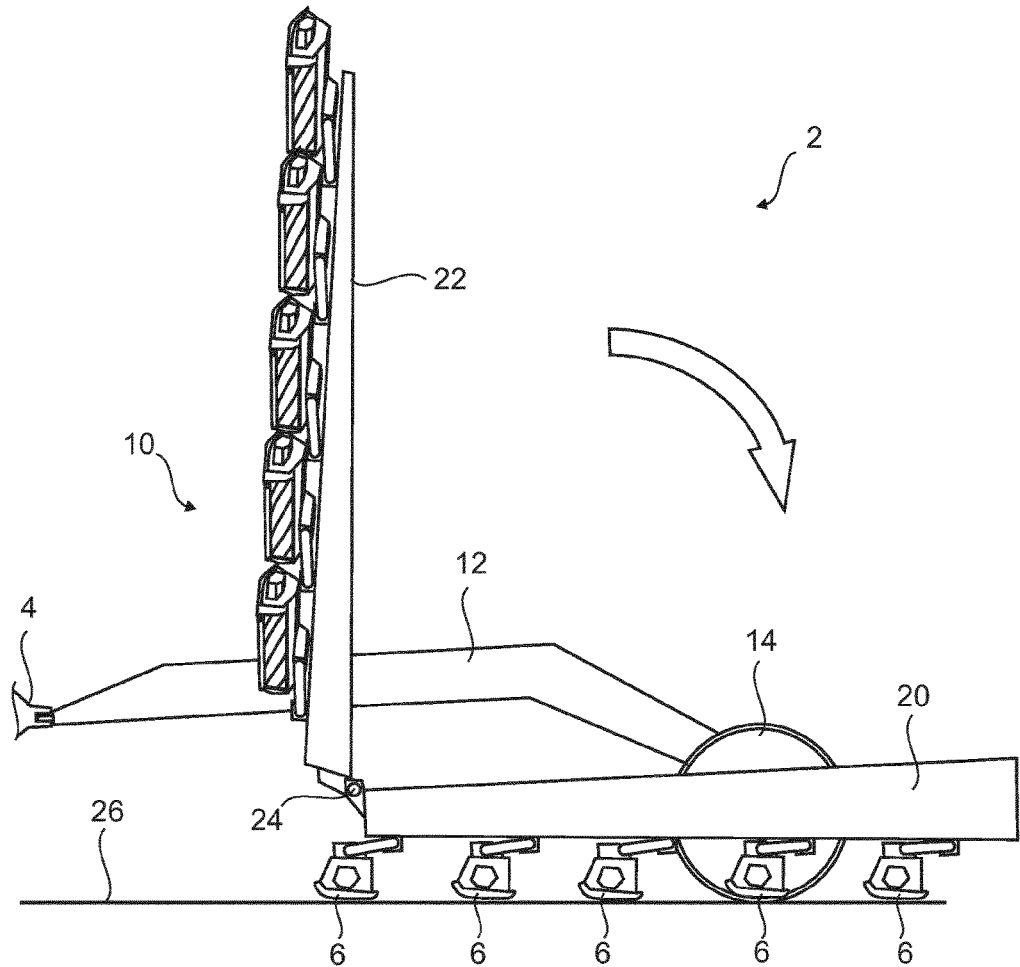

The FIG. 2 is a side view of a first operation for folding the mower's frame. The mower 2 is towed by a tractor 4 that is partially represented.

Each beam 10 comprises a plurality of portion. It preferably comprises a central portion 20 and a lateral portion 22 that are aligned. They may be linked to each other by pivot means 24 that may show horizontal pivot axes. The pivot means 24 may comprise a pivot junction associated with each beam 10. Each pivot junction shows a pivot axis that is perpendicular to its respective beam 10.

The pivot means 24 may comprise rotary engines (not represented). Alternatively, the pivot means 24 comprises actuators, like hydraulic actuators, and are eventually completed by levers.

The first operation consists in retracting the lateral portions 22 of the beams 10. The lateral portions 22 are folded up. The lateral portions 22 are switched from a forward position toward a rearward position.

During the first operation, each lateral portion 22 is pivoted in respect of his respective central portion 20 of substantially a half turn. Each lateral portion 22 is pivoted of an angle comprised between 160° and 200°, preferably an angle comprised between 170° and 190°, more preferably an angle comprised between 175° and 185°.

In the meantime, the cutting units 6 are placed in a non-mowing position. The non-mowing position may be a rest position. They are away from the ground 26. They no longer engage the ground 26. In an alternative embodiment of the invention, the cutting units 6 may reach their non-mowing position before or after the lateral portions are pivoted.

The FIG. 3 shows a side view of the mower 2 in a first intermediate step during the folding of the frame 8.

At this moment, the lateral portions 22 are placed back over the top of their respective central portions 20. Then, these portions (20, 22) are stacked. The portions are still in a "V" configuration. The stacked portions are still disposed laterally to the wheels 14. They are at the height of the wheels 14. The lateral portions extend along the central portions.

The FIG. 4 represents a second operation for folding mower 2 which is seen laterally.

The mower 2 is represented with his longitudinal portion 12, the hub 16 and the raise mechanism 18, the beams are not represented. At least one cutting unit 6 is linked to the raise mechanism 18 and/or at least one cutting unit 6 is linked to the hub 16. Preferably, the mower 2 comprises one cutting unit linked to the hub 16 transversally in a central position, and two cutting units linked also to the hub 16 and transversally disposed laterally to the central cutting unit of the raise mechanism. These three cutting units 6 are not settled in the general alignment of the cutting units 6 linked to the beams 10.

The hub 16 is linked to the longitudinal portion 12 by the raise mechanism. For this purpose, the later comprises a set of arms 28 that are pivotally linked to the longitudinal portion 12 and to the hub 16. The arms 28 may be substantially parallel. During the second operation, the arms 28 are pivoted upwardly of at least 10°, preferably at least 30°, more preferably at least 60°.

The raise mechanism 18 may comprise a lower arm 28 and an upper arm 28. The upper arm and the lower arm may show a trapezoidal shape or a rectangular shape. Each arm 28 presents a width in the continuity of the longitudinal portion and of the hub respectively.

The raise mechanism 18 also comprises an actuator 30, like a hydraulic actuator. When the actuator retracts 30, the hub 16 is lifted. This actuator 30 may be relied to the arms 28. It can eventually be linked to the longitudinal portion 12 at one end, and to the hub at the other end. The raise mechanism 18 is configured for lifting the beams 10 whilst generally keeping their orientation.

The raise mechanism 18 permits to lift the beams 10 above the wheels 14. In particular, the central portions 20 are lifted above the wheels 14. More peculiarly, the cutting units 6 linked under the central portions 20 are lifted above the wheels. At the end of the second operation, the mower 2 still extends on a broad area.

The FIG. 5 shows a third operation for folding the beams 10. The mower 2 is seen in a top view.

In this operation, the central portions 20 of the beams 10 are pivoted inwardly. They are pivoted in a forward direction. The central portions 20 are linked to the hub through rotation means 32. The rotation means 32 may rotate around generally vertical axis. These axes may be substantially tilted forwardly in order to bring down the forward extremities of the central portions 20. The rotation means 32 advantageously comprise actuators (not represented), like hydraulic actuators.

During the third operation, each central portion 20 is pivoted inwardly of an angle comprised between 5° and 90°, preferably an angle comprised between 20° and 70°, more preferably an angle comprised between 40° and 60°. At the end of this operation, the mower 2 reaches the transport configuration.

The FIG. 6 presents a side view of the transport configuration of the mower 2.

In this configuration, the beams 10 as a whole are placed above the wheels 14. The cutting units linked to the beams are also above the wheels. As we can notice on this picture, the fact that the beams comprise several portions permits to reduce the overall length of the mower 2 in its transport configuration. Then, the mower 2 is easier to pull. It also requires less area for parking.

The raise mechanism 18 for lifting the hub 16 may be configured to slightly incline the stacked portions 22 and 20. The forward extremity of the stacked portions may be inclined downwardly in order to lower the center of gravity of the mower 2. Consequently, the stability of the mower is increased in spite of its height.

In the transport configuration, the mower 2 is less than 2.50 m width. Its height is less than 4.00 m, preferably less than 3.50 m high, more preferably less than 2.50 m high.

The FIG. 7 represents a cutting unit 6 according to the invention.

The cutting unit 6 may be a reel mower cutting unit. The cutting unit 6 comprises a casing 36 that forms a shell. The cutting unit also comprises a cylinder 38 provided with at least one blade 40, preferably several blades 40 that are distributed around the cylinder 38. The blade or the blades 40 show a helicoidally shape. This shape describes a spiral around the cylinder. The bladed cylinder 38 may be hollow. It is pivotally articulated with respect to the casing 36. The width of the bladed cylinder 38 is at least 60 cm, preferably at least 80 cm, more preferably at least 100 cm.

Each blade 40 shows a sharp outer edge. During mowing, the bladed cylinder 38 turns in a way that throws mowed lawn backward. The skilled person in the art is able to recognize the mowing direction of the mower considering the blades' sharp edges.

The casing 36 covers at least partially the bladed cylinder 38 for stopping projections of stones or particles present in the grass. It prevents injuries for people or damages for the mower itself.

The cutting unit 6 also comprises an engine 42 that rotates the bladed cylinder 38. The engine may be placed laterally, outside the casing 36. It may be driven electrically or hydraulically. The engine 36 is plugged by wires or pressure ducts (not represented). The wires or the pressure ducts may extend inside the beams 10.

The cutting unit also comprises rolling means like a roller 44. The rolling means are adapted to engage the ground in a cutting configuration. They are configured for bearing at least the weight of the corresponding cutting unit 6. The rolling means permit to maintain an even cutting eight. They avoid cutting turf too shortly. The rolling means may comprise a single roller 44 disposed in a rear or in a front position of cutting unit 6. The rolling means may eventually comprise a front roller and a rear roller. Each roller 44 extends transversally on the majority of the bladed cylinder 38, preferably at least on the whole width of the bladed cylinder 38. The roller 44 is designed for withstanding chocks due to a stone lying in the grass.

The weight of the cutting unit is superior to 10 kg. The cutting unit 6 may be heavier than 30 kg. The cutting unit 6 may be heavier than 60 kg.

According to an alternative embodiment of the invention, the cutting unit may comprise a horizontal blade turning around a vertical axis. This horizontal blade may replace the cylinder.

The cutting unit 6 is linked to a beam of the mower. The mower comprises lift means that link the cutting unit 6 to the beam 10. The lift means may be articulating means. The lift means are configured for articulating the cutting unit 6 between a mowing position, in which the roller 44 may engage the ground, and a non-mowing position in which the roller is above the ground. Preferably, in the non-mowing position the roller is above the ground of at least 5 cm, preferably of at least 15 cm, more preferably of at least 40 cm.

The lift means comprise a crank 46 linked to the beam 10 and to the casing 36 of the cutting unit 6. Each extremity of the crank 46 presents a pivot link. Each pivot link essentially comprises a single degree of freedom. The pivot axis of each pivot link is preferably longitudinally oriented. The cutting unit 6 is free to rotate at the extremity of the crank 46. Then, it may flip in order to follow the shape of the ground when the mower is going on. This feature is interesting when the ground shows concave or convex surfaces The lift means also comprise an actuator 48. The actuator 48 may be activated electrically or hydraulically. The actuator 48 may be a linear actuator, preferably a linear hydraulic actuator. The actuator 48 may be linked to the crank 46 at one end and to the beam at the other end.

The lift means are configured for applying a load on the cutting unit 6. Then, the beam 10 and more generally the mower rely on the roller 44 of the cutting unit 6.

In an advantageous aspect of the invention, the mower comprises a plurality of lift means. Each cutting unit 6 is linked to the frame throw independent lift means. Independent lift means are configured for applying a load on each cutting unit 6. Then the frame's weight is distributed on all rollers of the cutting units. In the case drawn on FIG. 1, the frame's weight is distributed on 16.00 m width. All rollers act as a single roller that engages the ground and supports the mowers. Since the mower's wheels are longitudinally placed in the vicinity of the roller, the pressure applied by the wheels on the ground is reduced. In the case where the mower is an implement directly mounted on the frame of a tractor, the rollers will be able to support a part of the weight of the tractor.

The invention claimed is:

1. A mower, comprising:
    a frame forming a structure of a trailer;
    a plurality of cutting units generally disposed side by side, each cutting unit comprising:
        at least one roller intended to roll on the ground; and
    a lift assembly linking the cutting units to the frame and configured for moving the cutting units between a mowing position and a non-mowing position;
    wherein, in the mowing position, the lift assembly is configured for pressing the cutting units against the ground in order to distribute, at least partially, the mower's weight on the ground via the rollers of the cutting units.

2. The mower according to claim 1, wherein each of the rollers extends on the width of the corresponding cutting unit, the rollers covering at least 90% of the width of the mower.

3. The mower according to claim 1, wherein the plurality of cutting units is at least eight cutting units; and
    wherein the cutting units are reel mowing cutting units with a set of helical blades.

4. The mower according to claim 1, wherein the plurality of cutting units is at least twelve cutting units; and
    wherein the cutting units are reel mowing cutting units with a set of helical blades.

5. The mower according to claim 1, wherein the plurality of cutting units is at least eighteen cutting units; and wherein the cutting units are reel mowing cutting units with a set of helical blades.

6. The mower according to claim 1, wherein the plurality of cutting units is at least twenty-three cutting units; and
    wherein the cutting units are reel mowing cutting units with a set of helical blades.

7. The mower according to claim 1, wherein the lift assembly links independently each of the cutting units to the frame; and
    wherein the lift assembly comprises:
        a plurality of cranks;
        wherein each crank is linked to the frame and to one of the cutting units.

8. The mower according to claim 1, wherein the lift assembly comprises:
    a plurality of actuators;
    wherein each actuator is linked to the frame and directly or indirectly to one of the cutting units.

9. The mower according to claim 1, wherein the majority of the cutting units are disposed in order to transversally overlap their closest neighbor, the majority of the cutting units being disposed along two axes forming a "V" in a top view.

10. The mower according to claim 1, wherein the frame comprises:
    at least one beam which mainly extend transversally in the mowing position;
    wherein the majority of the cutting units are linked to the at least one beam; and
    wherein, in the mowing position, the at least one beam is mounted in a cantilever fashion.

11. The mower according to claim 1, wherein the frame comprises:
    two beams which mainly extend transversally in the mowing position;
    wherein the majority of the cutting units are linked to the two beams; and
    wherein, in the mowing position, the beams are mounted in a cantilever fashion.

12. The mower according to claim 11, wherein each of the two beams is pivotally mounted on the frame, so as to be foldable to a position along a longitudinal axis of the frame in a forward direction and/or an inward direction.

13. The mower according to claim 11, wherein each beam comprises:
    a lateral portion; and
    a central portion;
    wherein the lateral portion and the central portion are aligned in the mowing position; and
    wherein, in a transport configuration, the lateral portion of each of the two beams is folded back over the top of the corresponding central portion.

14. The mower according to claim 11, wherein the frame comprises:
    a hub to which the beams are linked; and
    a raise mechanism for lifting the hub from the mowing position to a transport configuration;
    wherein at least one of the cutting units is linked to the hub.

15. The mower according to claim 1, wherein the frame comprises:
    a longitudinal portion that mainly extends longitudinally and shows a front end and a rear end;
    wherein the cutting units are linked to the frame through one of the following:
        a rear half of the longitudinal portion; and
        the rear end of the longitudinal portion.

16. The mower according to claim 1, further comprising:
    a set of wheels rotatably fixed to the frame;
    wherein the mower is elongated and the wheels are fixed to the frame in the vicinity of a rear end of the frame.

17. The mower according to claim 16,
    wherein, in a transport configuration, the majority of the cutting units are above the wheels of the mower.

\* \* \* \* \*